UNITED STATES PATENT OFFICE.

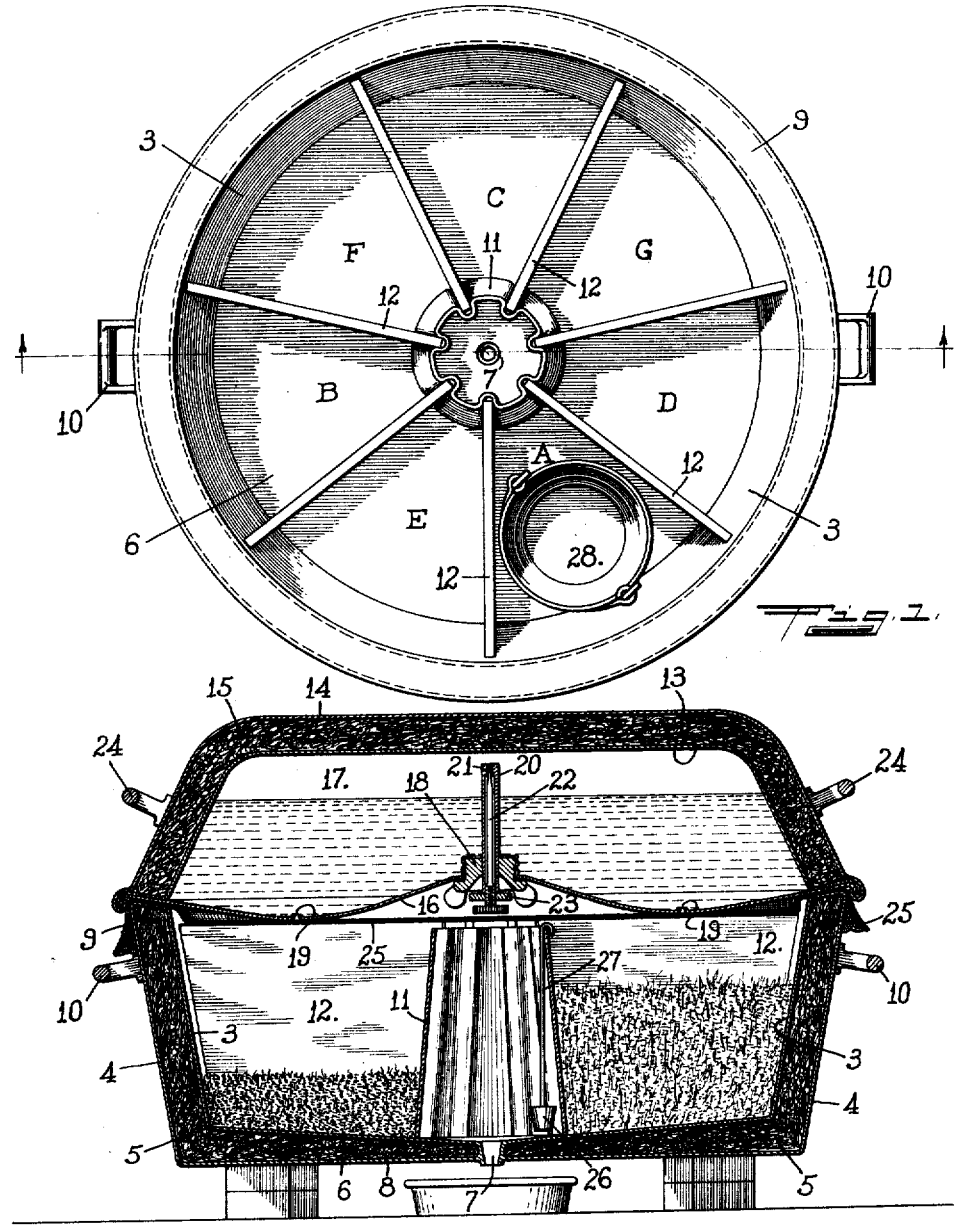

NILS A. RENSTROM, OF OMAHA, NEBRASKA; EROS A. RENSTROM ADMINISTRATOR OF SAID NILS A. RENSTROM, DECEASED.

PROCESS FOR SPROUTING GRAIN.

1,396,235.  Specification of Letters Patent.  Patented Nov. 8, 1921.

Application filed November 9, 1917.  Serial No. 201,395.

*To all whom it may concern:*

Be it known that I, NILS A. RENSTROM, a citizen of the United States, and a resident of Omaha, in the county of Douglas and State of Nebraska, have invented certain new and useful Improvements in Processes for Sprouting Grain, of which the following is a specification.

My invention relates to grain sprouting, and it is the object thereof to provide a method especially adapted for use in preparing sprouted grain, such as oats, for use as green feed for poultry, pet stock and the like. My invention is preferably carried out by means of a simple, inexpensive, compact and self-contained apparatus, operable in either cold or hot seasons, and capable of producing a daily supply or ration of the sprouted grain, when used in accordance with my sprouting method.

In the accompanying drawings Figure 1 is a plan view of the partitioned or compartmented container preferably used in carrying out my invention, and Fig. 2 is a vertical sectional view of a complete apparatus as constructed and arranged in accordance with my invention.

My method or process of sprouting grain is characterized by carrying on simultaneously within a heat-insulated inclosure the germination and subsequent development of a series of charges or batches of grain, each being in a different stage of growth, whereby the heat developed by the metabolism of the material in the more advanced stages is communicated to the material in the earlier stages of growth, thereby stimulating the latter, preventing overheating of the material in the advanced stages, and effecting a substantial equalization of temperatures throughout the several charges or batches of the series.

The sprouting process may be more readily understood by referring to the construction and arrangement of the preferred means or apparatus for carrying out the same. A tub-like receptacle of sheet metal is provided, having spaced inner and outer walls 3 and 4 with heat-insulating packing material 5 between them, the side-portions of the receptacle being trunco-conical in form, and the inner bottom-portion 6 being slightly inclined toward a central drain-tube 7 which is extended through the packing-space and the outer bottom-portion 8. The upper edge 9 of the receptacle is beveled or inclined inwardly, and suitable handles 10 are secured on opposite sides of the outer wall 4, as shown. At the center of the receptacle there is a tubular member 11, tapering slightly from its lower to its upper end, and its sides being formed with inwardly extending corrugations forming channels for receiving the inner edges of a series of vertical partition-plates 12 which extend out radially therefrom to the wall 3, as shown in Fig. 1. The lower edges of the plates 12 and of the member 11 rest loosely upon the inclined bottom-piece 6, so that water may pass freely beneath them, and so that they may be lifted out of the receptacle when desired. The height of the plates 12 is such that their upper edges are slightly below the inner margin of the beveled upper edge 9 of the receptacle, or proportionally as shown in Fig. 2. The radial partition-plates divide the space within the receptacle into a plurality of equal sector-shaped compartments A, B, C, D, E, F and G, there being preferably an odd number of the compartments, for example, seven, as shown in the drawing. It should be noted that the compartments designated as above do not adjoin each other serially in the order named, but have an alternating arrangement such that the compartment G lies between C and D, the compartment A lying between D and E, B lying between E and F, and C lying between F and G.

A cover for the compartmented receptacle is formed by inner and outer upwardly dished members 13 and 14 having between them a uniform packing-space filled with suitable heat-insulating packing material 15, the edges of said cover being shaped to conform with the beveled upper edge 9 of the tub or lower portion of the receptacle. Across the bottom of the dished or concave body of the cover there is secured a head 16, which forms, between the same and the inner member 13, a water-chamber 17. The outer portion of the head 16 is inclined or sloped downwardly and the central portion thereof slopes upwardly to a screw-threaded filling-opening which is normally closed by a plug or stopper 18. Arranged in a circle at the lowermost portion of the head 16 there is a series of small openings 19, preferably one for each of the several compartments A—G of the tub or main receptacle. The stopper 18 is provided with a tube 20 which extends through the same and upwardly therefrom to a point near the top of the water-chamber 17, said tube being provided at its upper end with a valve-seat 21 adapted for engagement with a tapering stem or needle-valve 22. The latter is screwed into the lower end of the tube, being provided at its lower end with a head, and having on the threaded portion a locknut 23 for retaining the stem in adjusted positions. Small openings in the side of the tube beneath the stopper admit air to the space around the valve-stem, so that the air may pass up through the seat 21 when the valve is not in closed position. On the sides of the cover there are suitable handles 24 for convenience in lifting the same. For filling the water-chamber 17, the cover is inverted and the stopper 18 removed, said stopper being replaced after the chamber is filled and before the cover is replaced in its normal position. When the cover is in place upon the receptacle the water from the chamber 17 drips through the openings 19 at a rate determined by the size of the air inlet to the chamber through the valve-seat 21, and said inlet is so regulated by the needle-valve that the water will escape from the chamber at the desired rate. Preferably a sheet or layer 25 of loosely woven fabric such as burlap, is placed over the top of the receptacle beneath the cover, so as to rest upon the upper edges of the partition-plates 12. A stopper 26 is provided for the drain-tube 7, said stopper having a wire handle 27 with a hook at its upper end, so that the same when not in use may be hung upon the upper edge of the center member 11, as shown in Fig. 2.

In the sprouting of grain such as oats, for use as green feed for poultry and the like, it is preferable that the dry grain be first soaked in water for a period of 8 to 12 hours, the water then drained off so as to leave only that which adheres to the material, and the grain then remoistened two or three times in each twenty-four hours during the period of the sprouting, which requires from five to seven days under proper temperature conditions. After such a time the grain will be thoroughly sprouted, and will have increased in weight and bulk to about three times that of the dry grain. The germination and and growth of the sprouts involves the production of a considerable amount of heat, which is greatest in the later stages of the process and least at the beginning. Insufficient heat retards the germination, and excessive heat causes rotting, so that both extremes of temperature must be avoided in order to successfully carry out the sprouting process.

In the use of the described apparatus, after once starting the same, each of the several compartments A—G contains one of a series of charges or batches of the grain, each in a different stage of the sprouting process. In one compartment, as A, there is placed a bucket 28 or the like in which a charge of the dry grain is being soaked in water. After soaking for a suitable time this charge of the grain is dumped from the bucket into the bottom of the compartment, so that the excess of water may drain therefrom, passing inwardly along the inclined bottom-portion 6 to the drain-tube 7. Another charge of the grain is then placed in the bucket, and the latter filled with water and then placed in the next compartment of the series during the period of soaking. At intervals of eight to twelve hours the contents of the several compartments are remoistened by filling the water-chamber 17 of the cover and replacing the same upon the receptacle, so that the water escaping from the chamber through the openings 19 will soak through the fabric cover 25 and be thereby distributed with comparative uniformity over the surface of the material, the excess of water draining to the center and passing off through the tube 7. The charges are placed successively in the compartments G, F, E, D, C, B and A, one of the compartments preferably being emptied each day of its charge of sprouted grain, and a fresh charge started therein. It will be noted that by the use of the several compartments in the order indicated, the charges in the more advanced stages of growth are interspersed or alternated with the charges in which the germination is commencing or which are in the earlier stages of growth. Thus when a fresh charge is placed in the compartment A, it is between the charges in the compartments E and D, which are in stages of development at which the metabolism produces considerable heat. By so interspersing the successive charges of the series, the temperature of the material throughout the receptacle is substantially equalized. Owing to the heat-insulating inclosure of the material, the temperature thereof may be readily controlled and maintained at the point most favorable to the sprouting of the grain. In cool and moderately cold weather sufficient warmth is produced by the material itself to maintain the temperature thereof at a proper degree; in extremely cold weather the desired temperature is maintained by heating the water which is placed in the chamber 17 for use in moistening the grain; and in warm or hot seasons overheating of the material is prevented by using cold water for the moistening, the moistening being repeated more often during extremely hot seasons.

When operated as above described, the apparatus produces a batch or charge of sprouted grain each day, thereby furnishing a daily ration of green feed suitable for poultry and the like.

It may be noted that when the sprouting of a charge of grain is completed, the same forms a fibrous mass which is bound together by the entanglement of roots and sprouts. This fibrous mass of the sprouted grain is readily removed from the compartment owing to the tapering of the same toward the bottom of the receptacle, and also to the fact that the sides and bottom of the compartments are smooth and imperforate, so as to offer no means of attachment for the roots and sprouts.

Now, having described my invention, what I claim and desire to secure by Letters Patent is:

1. The method of sprouting grain, consisting in juxtaposing a series of charges of grain in differing stages of germination, insulating the same against external temperature changes, periodically moistening the charges, maintaining an interspersed arrangement of the several charges whereby to facilitate the communication of heat from the more advanced to the less advanced charges, and removing the fully sprouted charges and filling out the series with fresh charges at successive substantially uniform time intervals.

2. The method of producing batches of sprouted grain at successive substantially uniform time intervals, consisting in juxtaposing a series of charges of grain in uniformly different stages of germination, insulating the same against external temperature changes, periodically moistening the charges, maintaining an interspersed arrangement of the several charges whereby heat produced by metabolism of the more advanced charges may radiate directly to the less advanced charges, removing the successive charges as the same become fully sprouted, and replacing the removed charges with fresh charges of ungerminated grain.

N. A. RENSTROM.